United States Patent [19]

Nimura

[11] 4,114,056
[45] Sep. 12, 1978

[54] ROTOR FOR ALTERNATING CURRENT GENERATOR

[75] Inventor: Takayasu Nimura, Nagoya, Japan

[73] Assignee: Nippondenso Co., Ltd., Kariya, Japan

[21] Appl. No.: 781,003

[22] Filed: Mar. 24, 1977

[30] Foreign Application Priority Data

Mar. 30, 1976 [JP] Japan .................................. 51-34721
Jan. 14, 1977 [JP] Japan .................................. 52-3502

[51] Int. Cl.² ......................................... H02K 15/00
[52] U.S. Cl. ....................................... 310/42; 310/71; 310/194; 310/263
[58] Field of Search ................. 310/71, 194, 232, 263, 310/42

[56] References Cited

U.S. PATENT DOCUMENTS

| | | | |
|---|---|---|---|
| 1,849,263 | 3/1932 | Apple | 310/71 |
| 3,271,604 | 9/1966 | Priddy | 310/71 X |
| 3,603,825 | 9/1971 | Sheridan | 310/194 |
| 3,671,906 | 6/1972 | Hodges et al. | 310/263 X |
| 3,979,615 | 9/1976 | Neff | 310/71 |

*Primary Examiner*—Mark O. Budd
*Attorney, Agent, or Firm*—Cushman, Darby & Cushman

[57] ABSTRACT

A rotor of an alternating current generator has a field excitation assembly supported on a rotor shaft including a pair of rotor segments forming a cavity therein, a bobbin made of an insulating resin disposed in the cavity and a field excitation coil wound on the bobbin. The bobbin has a cylindrical portion and a pair of flanged portions at both ends thereof for forming room for the field excitation coil. On one of the flanged portion, a pair of projections are integrally formed therewith extending axially and outwardly, which are press-fitted into a pair of through holes formed on one of the rotor segments. Each of the projections is formed with not only an axially extending groove for receiving a field coil terminal, but a radially and axially extending slit communicating the outside of the projection with the groove for guiding and receiving a coil starting or terminating end of the field coil. The coil ends are hung on the field coil terminals press-fitted into the projections, whereby neither the coil starting nor terminating end is drawn back out of the bobbin even before the bobbin is assembled in the rotor segments.

5 Claims, 12 Drawing Figures

ROTOR FOR ALTERNATING CURRENT GENERATOR

BACKGROUND OF THE INVENTION

The present invention relates to a rotor of an alternating current generator mounted on a motor vehicle, and especially to a rotor of the type having a pair of rotor segments, a bobbin disposed in the segments and a field coil wound on the bobbin.

In a conventional rotor of an alternating current generator, electrical connections between coil starting and terminating ends of a field coil wound on a bobbin and a slip-ring assembly are not sufficiently strong or resistant against vibrations, centrifugal forces produced during the operation of the generator. Further, the steps for the electrical connections are very troublesome, because, for example, an automatic welding machine can be hardly used.

Furthermore, in the conventional rotor of the type, a step for assembling a bobbin with a field excitation coil to rotor segments is not easily proceeded since much care must be taken for preventing the coil starting or terminating ends from being drawn back from the bobbin during the assembling step.

It is, therefore, an object of the present invention to provide a rotor of an alternating current generator having a bobbin of an effective structure, whereby the coil starting or terminating ends of the field coil are fixedly held in place on the bobbin to facilitate subsequent assembling steps such as a step for interposing the bobbin between the rotor segments, a step for electrically connecting the coil ends with a slip-ring assembly, and so on.

According to one aspect of the present invention, a pair of projections are integrally formed with one of the flanged portion of the bobbin, extending axially and outwardly from the flanged portion. Each of the projections is formed with an axially extending groove and a radially and axially extending slit communicating the outside of the projection with the groove over the entire axial length of the projection. Field coil terminals made of an electrically conductive flat metal strip are press-fitted respectively into the grooves of the projections. The coil starting and terminating ends are guided by and held in the slits and hung on the press-fitted terminals, whereby the coil ends are not drawn out of the bobbin. The projections with the terminals and coil ends are also press-fitted into through holes of the rotor segment so that they are further rigidly secured to the projections.

These and other objects, advantages and features of the present invention will become more apparent from the following detailed description of the embodiment when read in conjunction with the accompanying drawings.

DETAILED DESCRIPTION OF THE PREFERRED EMBODIMENTS

Figure 1:
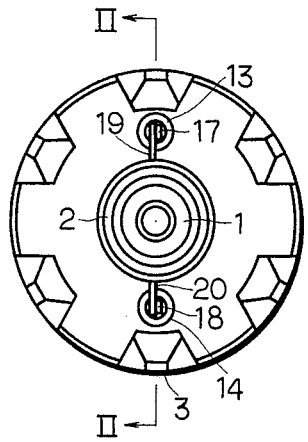
FIG. 1 is a front view of a rotor of an alternating current generator according to a first embodiment of the present invention.
Figure 2:
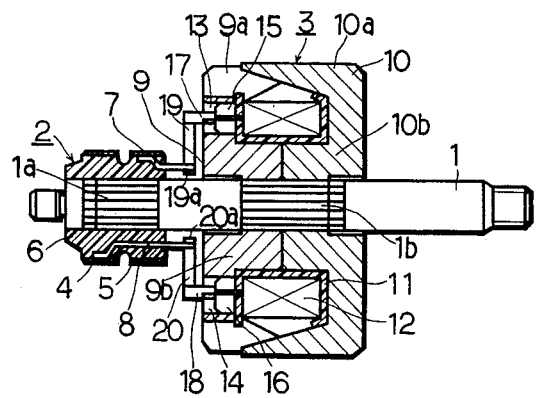
FIG. 2 is a sectional view taken along line II — II in FIG. 1.

With reference to FIGS. 1 and 2 showing a rotor of an alternating current generator, for example mounted on a motor vehicle, numeral 1 designates a rotor shaft rotatably installed in the generator and driven by an engine (not shown). A slip-ring assembly 2 and a field excitation assembly 3 are supported on the rotor shaft 1 by means of respective knurled portions 1a and 1b formed on the shaft 1, whereby the assemblies 2 and 3 are concentric with each other.

The slip-ring assembly 2 comprises a pair of cylindrical slip rings 4 and 5 insulated from each other and held by an insulating body 6 made of an insulating synthetic resin, which is press-fitted onto the knurled portion 1a of the rotor shaft 1. The slip-ring assembly 2 also has a pair of terminals 7 and 8 of a flat metal strip made of an electrically conductive material held inside the slip rings 4 and 5 and opposing to each other in a radial direction. Each one end of the terminals 7 and 8 is embedded in the insulating body 6 and is respectively connected with the slip rings 4 and 5 as seen from FIG. 2. The other ends thereof extend and protrude in the same axial direction toward the field excitation assembly 3 out of the insulating body 6.

The field excitation assembly 3 includes a pair of rotor segments 9 and 10, a bobbin 11 having a H-shape cross-sectional configuration and made of a synthetic material, and a field excitation coil 12 mounted on the bobbin 11. Each of the rotor segments 9 and 10 has a plurality of axially extending pole tips 9a and 10a at the outer periphery and a cylindrical core 9b and 10b at the central portion which is press-fitted onto and supported by the knurled portion 1b of the rotor shaft 1 with the pole tips 9a and 10a interlacing with each other, thus forming a cavity therein. On one of the rotor segments 9, there are formed a pair of axially extending through holes 13 and 14 which are opposing with each other in a radial direction.

Figure 3:
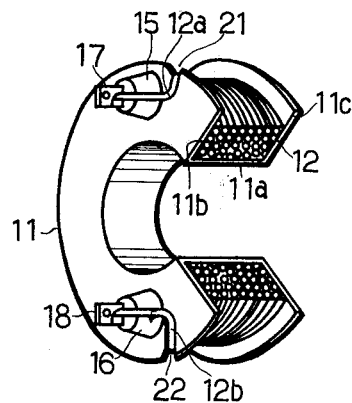
FIG. 3 is a perspective view showing a bobbin wound with a field coil used in the rotor in FIG. 2 when a portion thereof is cut away.

The bobbin 11 is interposed between and held by the pair of rotor segments 9 and 10 and is disposed in the cavity defined by the segments. As seen from FIG. 3, the bobbin 11 includes a cylindrical portion 11a and flanged portions 11b and 11c at its both ends, thus forming a H-shape cross-sectional configuration. A pair of projections 15 and 16 are integrally formed on the flanged portion 11b of the bobbin 11 outwardly and axially extending therefrom and opposing with each other in a radial direction. The projections 15 and 16 are inserted or press-fitted into the through holes 13 and 14 formed on the rotor segment 9 to prevent the relative movement of the bobbin 11 with respect to the rotor segments 9 and 10.

A pair of field coil terminals 17 and 18 made of a conductive material are respectively inserted or press-fitted into and held by the projections 15 and 16, whose inner ends are respectively and electrically connected with a coil starting end 12a and a coil terminating end 12b of the field excitation coil 12 wound on the bobbin 11. Each of the outer ends of the terminals 17 and 18 axially extends and protrudes from the projections 15 and 16 towards the slip-ring assembly 2 as best shown in FIG. 2. Those outer ends of the terminals 17 and 18 are respectively and electrically connected with the terminals 7 and 8 protruding from the insulating body 6 by means of the respective connecting strips 19 and 20 which extend radially as shown in FIG. 1. Each inner end of the connecting strips 19 and 20 is bent being normal to the radially extending strips 19 and 20, which is designated by numerals 19a or 20a in FIG. 2, so that the outer ends of the terminals 7 and 8 can be connected with the bent portions 19a and 20a of the connecting strips 19 and 20 by welding them in a radial direction, that is welding electrodes (not shown) can be arranged to weld the connecting strips 19 and 20 with the terminals 7 and 8 in the radial direction. The connecting strips 19 and 20 are also connected with the field coil terminals 17 and 18 by welding them in a circumferential direction, that is a direction normal to the sheet of FIG. 2, whereby the welding can be carried out by an automatic welding machine. Those welding steps are briefly explained hereinafter. The bent portions 19a and 20a are first welded in a radial direction with the terminals 7 and 8 protruded from the insulating body 6 before the slip-ring assembly 2 is secured to the rotor shaft 1. During this step of welding, there is a sufficient room, especially between the terminals 7 and 8, for the welding electrodes so that the welding can be easily and effectively proceeded. The connecting strips 19 and 20 are then welded with the field coil terminals 17 and 18 after the slip-ring assembly 2 as well as the field excitation assembly 3 is supported on the rotor shaft 1, however since the welding is proceeded in a circumferential direction as explained above, neither the slip-ring assembly 2 nor the field excitation assembly 3 prevents the welding electrodes from moveing in the circumferential direction. In order to ensure the easy and effective welding during the above welding step, it is necessary for the field coil terminals 17 and 18 to be rigidly held by the bobbin 11.

It should be also noted that since the terminals 7 and 8, field coil terminals 17 and 18 and connecting strip 19 and 20 are respectively of a flat plate type having a rigidity, the above welding can be easily and effectively proceeded, and further disconnections can be also prevented among the terminals 7, 8, field coil terminals 17 and 18 and connecting strips 19 and 20, which may otherwise occur during the operation of the generator by vibrations or centrifugal forces.

Figure 4:
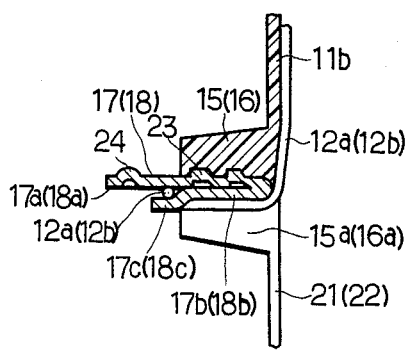
FIG. 4 is an enlarged sectional view showing a field coil terminal press-fitted into a projection formed on the bobbin.
Figure 5:
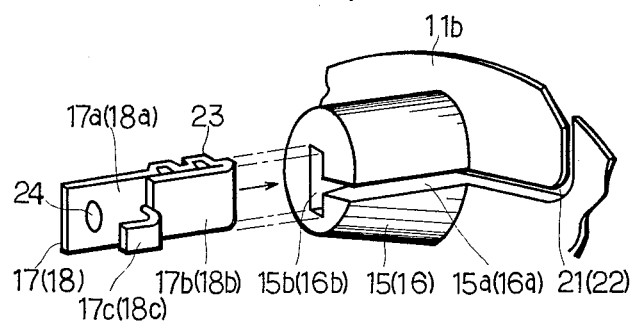
FIG. 5 is an enlarged perspective view showing the terminal and the projection.

Referring to FIGS. 4 and 5 showing the detailed construction of the projections 15 and 16 integrally formed on the flanged portion 11b of the bobbin 11, a groove 15b (16b) is formed in the projection 15 (16) extending axially therethrough for receiving the field coil terminal 17 (18). A slit 15a (16a) normal to the groove 15b (16b) is also formed radially and axially extending, for communicating the outside of the projection 15 (16) with the groove 15b (16b) thus forming a T-shaped groove in the projections 15 and 16. Another slit (or guiding slit) 21 (22) is formed on the flanged portion 11b of the bobbin 11 adjacent to the projection 15 (16) communicated with the slit 15a (16a) on the projection 15 (16) for guiding the coil starting end 12a (or the coil terminating end 12b) of the field coil 12 to the slit 15a (16a) of the projection 15 (16).

Each of the field coil terminals 17 and 18 is formed of a metal strip of an electrically conductive material being folded, thus forming a long and a short terminal sections 17a (18a) and 17b (18b). Provided on the long terminal section 17a (18a) are protrusions 23 for preventing the terminal 17 (18) from being taken away from the groove 15b (16b) of the projection 15 (16), and a convex 24 with which the connecting strip 19 (20) is welded. A tongue portion 17c (18c) is formed on the short terminal section 17b (18b) for holding and securing the coil starting (terminating) end 12a (12b) of the field coil 12. Accordingly, when the terminal 17 (18) is inserted or press-fitted into the groove 15b (16b), the protrusions 23 bite the inner surface of the groove 15b (16b) so that the terminal 17 (18) is rigidly held by or secured to the projection 15 (16).

The coil starting and terminating ends 12a and 12b of the field coil 12 are respectively guided by the slits 15a and 21 and the slits 16a and 22 and then fixedly held by the tongue portions 17c and 18c as seen from FIG. 4, so that neither the coil starting nor terminating end is drawn back out of the bobbin 11 even before the bobbin is assembled in the rotor segments 9 and 10, thus handling or carrying the bobbin 11 with the field coil 12 fixedly wound thereon. The coil starting and terminating ends 12a and 12b may be subjected to soldering if necessary, whereby the ends 12a and 12b can be secured and connected to the terminals 17 and 18 more rigidly ensuring the electrical connections therebetween. When guiding the coil starting and terminating ends 12a and 12b to the tongue portions 17c and 18c through the slits 21 and 15a and the slits 22 and 16a, the coil ends 12a and 12b are bent along rounded portions of the terminals 17 and 18, at which the metal strips therefor are folded, so that there does not occur a disconnection of the coil ends 12a and 12b as best seen in FIG. 4. With respect to the configuration of the projection 15 or 16, it should be noted that the largest outer diameter of the projection 15 is made to be slightly larger than the inner diameter of the through hole 13 formed on the rotor segment 9 and the outer diameter of the projection 15 is gradually decreased as a distance from the flanged portion 11b is increased. Thus, the projection 15 (16) is formed into a tapered configuration. When the bobbin 11 with the tapered projections 15 and 16 is assembled being interposed between the pair of rotor segments 9 and 10, the tapered projections 15 and 16 are well press-fitted into the through holes 13 and 14 decreasing the width of the slit 15a (16a) with results that the terminals 17 and 18 are more rigidly secured to the bobbin 11 and the coil starting and terminating ends 12a and 12b are also fixedly held in the groove 15b and 16b of the projections 15 and 16.

In FIGS. 6 to 12 showing a second embodiment of the present invention, the same reference numerals are used to designate the same or similar parts shown in the first embodiment in FIGS. 1 to 5. Different parts and constructions from the first embodiment will be mainly explained hereinafter.

Figure 6:
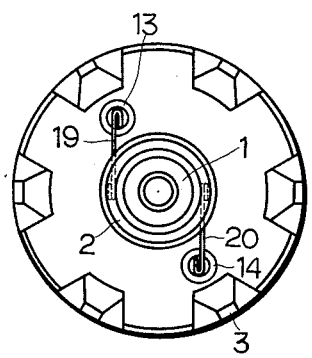
FIG. 6 is a front view of a rotor according to a second embodiment of the present invention.
Figure 7:
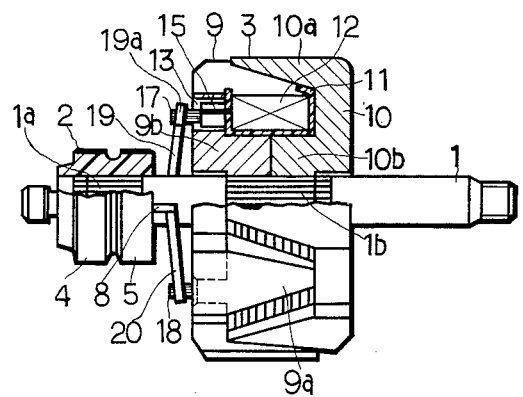
FIG. 7 is a partly sectional view showing the rotor in FIG. 1.
Figure 8:
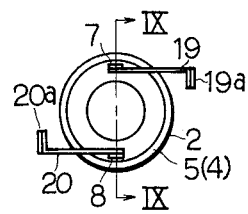
FIG. 8 is a front view of a slip-ring assembly used in the rotor shown in FIGS. 6 and 7.
Figure 9:
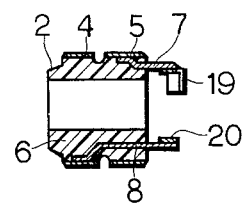
FIG. 9 is a sectional view taken along line IX — IX in FIG. 8.

Bent portions 19a and 20a are formed on the connecting strips 19 and 20 at not the inner ends but the outer ends as best seen in FIG. 8, for respectively folding the field coil terminal 17 and the coil starting end 12a, and the field coil terminal 18 and the coil terminating end 12b in the bent portions 19a and 20a when they are folded as seen from FIGS. 6 and 7.

The connecting strips 19 and 20 are welded with the terminals 7 and 8 at their inner ends and extend in directions almost tangential to a circle of the slip rings 4 and 5 when axially viewed as shown in FIG. 6 or 8, and in directions slanting against the rotor segment 9 as shown in FIG. 7. By slanting the connecting strips against the rotor segment 9 as explained above, it becomes possible to make length of each of the terminals 7, 8, 17 and 18 as small as possible.

Figure 10:
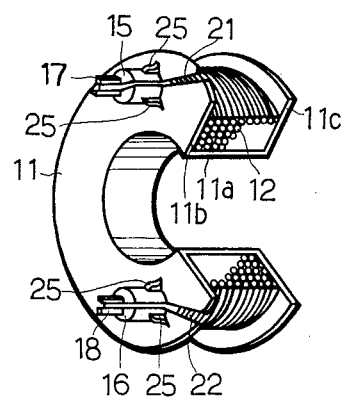
FIG. 10 is a perspective view showing a bobbin wound with a field coil used in the rotor shown in FIGS. 6 and 7.
Figure 11:
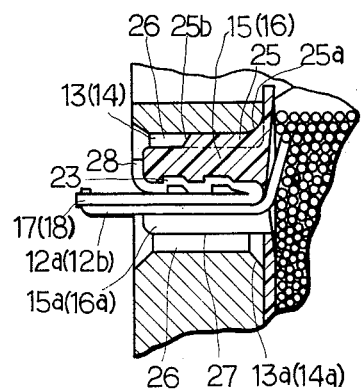
FIG. 11 is an enlarged sectional view showing a field coil terminal press-fitted into a projection of the bobbin.
Figure 12:
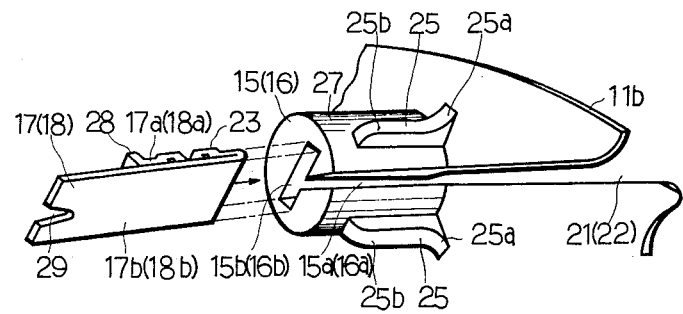
FIG. 12 is an enlarged perspective view showing the terminal and the projection.

Modified terminals and projections are shown in FIGS. 10 to 12. As best seen from FIG. 12, a stopper portion 28 is formed on the short terminal section 17a (18a) for preventing the terminal 17 (18) from being press-fitted into the groove 15b (16b) deeper than that required. A notch 29 is also formed on the long terminal section 17b (18b) for hanging thereon the coil starting (or terminating) end 12a (12b), so that the coil end 12a or 12b is temporarily fixed to the terminal 17 (18) until the terminal 17 (18) with the coil starting (terminating) end 12a (12b) is connected with the connecting strip 19 (20) by fusing. As seen from FIG. 12, the protrusions 23 are formed on the short terminal section 17a (18a) contrary to the first embodiment.

Each of the projections 15 and 16 comprises a cylindrical portion 27 having the same diameter smaller than the inner diameter of the through hole 13 over the entire longitudinal length thereof, and a plurality of ribs 25 longitudinally extending and integrally formed with the cylindrical portion 27 on the outer periphery thereof. The largest diameter of the circumscribed circle defined by the ribs 25 is made to be slightly larger than the inner diameter of the through hole 13 or 14 and the diameter of the circumscribed circle is gradually decreased as a distance from the flanged portion 11b is increased. Thus, when the projection 15 is press-fitted into the through hole 13 formed on the rotor segment 9, the ribs 25 as well as the cylindrical portion 27 of the projection is subjected to compression or contraction, so that not only the terminal 17 but the coil end 12a is rigidly secured to and held by the projection 15.

Curved portions 25a are formed on the ribs 25 adjacent to the flanged portion 11b for abutting on a beveling 13a (14a) formed on the through hole 13 (14) when press-fitted as shown in FIG. 11, so that the relative movement of the bobbin 11 with respect to the rotor segment 9 is surely prevented.

Rounded portions 25b are also formed on the ribs 25 remote from the flanged portion 11b, so that the insertion of the projections 15 and 16 is facilitated.

According to the second embodiment just described, spaces 26 are made between the ribs 25, the cylindrical portion 27 and the through hole 13 (14) when the projection 15 (16) is press-fitted into the through hole 13 (14) as shown in FIG. 11, into which an insulating adhesive material such as varnish can be poured during an insulation treatment for the field excitation coil 12, whereby the terminal 17 (18) as well as the coil starting (terminating) end 12a (12b) is further rigidly held in the projection 15 (16).

It should be also noted that the slit 21 formed on the flanged portion 11b of the bobbin 11 extends in the same direction as that of the slit 15a, so that guiding of the coil starting or terminating end 12a or 12b can be smoothly proceeded. As seen from FIG. 12, the slit 15a (16a) is communicated with the groove 15b (16b) at an angle.

What is claimed is:

1. A rotor for an alternating current generator comprising:
   a rotor shaft;
   a slip-ring assembly, supported on said rotor shaft, having a pair of slip rings insulated from each other and held by an insulating body, said assembly also having a pair of terminals made of an electrically conductive flat metal strip, each inner end of said terminals being held in said insulating body and electrically connected with the respective slip rings, and each outer end thereof extending outwardly in the same direction;
   a field excitation assembly supported on said rotor shaft concentrically with said slip-ring assembly, said field excitation assembly including:
   a pair of rotor segments supported on said rotor shaft, each having a plurality of inwardly and axially extending pole tips at its outer periphery for forming a cavity therein, one of said rotor segments adjacent to said slip-ring assembly being formed with a pair of through holes communicating the outside of the rotor segment with said cavity;
   a bobbin, made of an insulating resin, disposed in said cavity for rotation together with said rotor segments, said bobbin having a cylindrical portion and a pair of flanged portions at both ends thereof, said bobbin also having a pair of projections integrally formed with one of said flanged portions and extending outwardly therefrom;
   each of said projections being formed with an axially extending groove and a radially and axially extending slit for communicating the outside of the projection with said axially extending groove over the entire axial length;
   the flanged portion of said bobbin, on which said pair of projections are integrally formed with, being formed with guiding slits respectively communicating the outside of said flanged portion with said radially and axially extending slits of said projections;
   a field excitation coil wound on said bobbin and having coil starting and terminating ends;
   a pair of field coil terminals respectively press-fitted into said axially extending grooves of said projections;
   said coil starting and terminating ends being respectively inserted into said radially and axially extending slits of said projections and respectively hung to said field coil terminals;
   said projections being respectively press-fitted into said through holes of said rotor segment whereby the relative movement of said bobbin with respect to said rotor segments is prevented and each of the field coil terminals and each of the coil starting and terminating ends is rigidly held in said projections of said bobbin; and
   a pair of connecting strips for respectively electrically connecting said field coil terminals held by said projections with said terminals of said slip-ring assembly, the rotor being formed by incorporating the steps of:

press-fitting the field coil terminals into said grooves prior to winding the field excitation coil; and inserting the coil starting and terminating ends into said slits, and hanging said ends to the field coil terminals, prior to disposing the bobbin in said cavity.

2. A rotor for an alternating current generator as set forth in claim 1, wherein each of said projections integrally formed with the flanged portion is made so that the largest outer diameter thereof is slightly larger than the inner diameter of said through hole of the rotor segment and the outer diameter is gradually decreased as a distance from said flanged portion is increased.

3. A rotor for an alternating current generator comprising:

a rotor shaft;

a slip-ring assembly, supported on said rotor shaft, having a pair of slip rings insulated from each other and held by an insulating body, said assembly also having a pair of terminals made of an electrically conductive flat metal strip, each inner end of said terminals being held in said insulating body and electrically connected with the respective slip rings, and each outer end thereof extending outwardly in the same direction;

a field excitation assembly supported on said rotor shaft concentrically with said slip-ring assembly, said field excitation assembly including:

a pair of rotor segments supported on said rotor shaft, each having a plurality of inwardly and axially extending pole tips at its outer periphery for forming a cavity therein, one of said rotor segments adjacent to said slip-ring assembly being formed with a pair of through holes communicating the outside of the rotor segment with said cavity;

a bobbin, made of an insulating resin, disposed in said cavity for rotation together with said rotor segments, said bobbin having a cylindrical portion and a pair of flanged portions at both ends thereof, said bobbin also having a pair of projections integrally formed with one of said flanged portions and extending outwardly therefrom;

each of said projections including a cylindrical portion having the same outer diameter smaller than the inner diameters of said through holes over the entire longitudinal length thereof and a plurality of longitudinally extending ribs integrally formed with said cylindrical portion on the outer periphery thereof, the largest diameter of the circumscribed circle defined by said ribs being slightly larger than the inner diameters of said through holes; and each of said projections being formed with an axially extending groove and a radially and axially extending slit for communicating the outside of the projection with said axially extending groove over the entire axial length;

the flanged portion of said bobbin, on which said pair of projections are integrally formed with, being formed with guiding slits respectively communicating the outside of said flanged portion with said radially and axially extending slits of said projections;

a field excitation coil wound on said bobbin and having coil starting and terminating ends;

a pair of field coil terminals respectively press-fitted into said axially extending grooves of said projections;

said coil starting and terminating ends being respectively inserted into said radially and axially extending slits of said projections and respectively hung to said field coil terminals;

said projections are respectively press-fitted into said through holes of said rotor segment whereby: the relative movement of said bobbin with respect to said rotor segments is prevented; each of the field coil terminals and each of the coil starting and terminating ends is rigidly held in said projections of said bobbin; and spaces are made between the ribs, the cylindrical portion of said projections and said respective through holes for each press-fitted projection; and a pair of connecting strips for respectively electrically connecting said field coil terminals held by said projections with said terminals of said slip-ring assembly.

4. A rotor for an alternating current generator as set forth in claim 3, wherein said field excitation assembly further includes an insulating adhesive material poured into said spaces, whereby said field coil terminals as well as said coil starting and terminating ends are more rigidly held in said projections.

5. A rotor for an alternating current generator as set forth in claim 1, wherein said field coil terminal is made of an electrically conductive flat metal strip and is folded to form long and short terminal sections, one of said long and short terminal sections being provided with protrusions protruding outwardly therefrom for preventing said field coil terminal from being taken away from said groove of said projection.

* * * * *